United States Patent
Hussain et al.

(10) Patent No.: US 9,243,513 B2
(45) Date of Patent: Jan. 26, 2016

(54) FLUID IMPINGEMENT ARRANGEMENT

(75) Inventors: Zahid M Hussain, Derby (GB);
Christopher T J Sheaf, Derby (GB);
Andrew J Mullender, Nottingham (GB); David MacManus, Olney (GB);
Brian A Handley, Derby (GB)

(73) Assignee: ROLLS-ROYCE PLC, London (GB)

( * ) Notice: Subject to any disclaimer, the term of this patent is extended or adjusted under 35 U.S.C. 154(b) by 1138 days.

(21) Appl. No.: 13/267,256

(22) Filed: Oct. 6, 2011

(65) Prior Publication Data

US 2012/0137650 A1 Jun. 7, 2012

(30) Foreign Application Priority Data

Dec. 2, 2010 (GB) .................................. 1020418.8

(51) Int. Cl.
  *F01D 25/02* (2006.01)
  *F02C 7/047* (2006.01)
  *F01D 25/08* (2006.01)
  *F02C 7/24* (2006.01)

(52) U.S. Cl.
  CPC ............... *F01D 25/02* (2013.01); *F01D 25/08* (2013.01); *F02C 7/047* (2013.01); *F02C 7/24* (2013.01); *F05D 2260/201* (2013.01)

(58) Field of Classification Search
  CPC ........... F02C 6/08; F02C 7/045; F02C 7/047; F02C 7/24; F02C 9/18; F15C 1/22; B05B 1/08; F05D 2260/16; F05D 2260/96; F05D 2260/962; F01D 5/18; F01D 5/181; F01D 25/02; F01D 25/08; F01D 25/10; F01D 25/12; F01D 25/14

USPC ............. 60/782, 785, 39.093, 725, 752, 754, 60/806, 39.83; 239/124–127, 589, 590, 239/590.5, 601, 589.1; 181/196, 214, 215, 181/241

See application file for complete search history.

(56) References Cited

U.S. PATENT DOCUMENTS

| | | | |
|---|---|---|---|
| 4,525,998 A | | 7/1985 | Schwarz |
| 4,694,992 A | * | 9/1987 | Stouffer .................... 239/265.23 |
| 5,397,217 A | * | 3/1995 | DeMarche et al. .......... 416/97 R |
| 5,957,660 A | * | 9/1999 | Evans et al. ................. 416/97 R |
| 7,128,082 B1 | * | 10/2006 | Cerretelli ................... B05B 1/08 137/14 |
| 2006/0255167 A1 | * | 11/2006 | Vogel et al. ....................... 239/1 |
| 2010/0123031 A1 | * | 5/2010 | Weber ......................... 239/589.1 |

FOREIGN PATENT DOCUMENTS

| | | |
|---|---|---|
| EP | 0 877 149 A2 | 11/1998 |
| EP | 2 243 931 A2 | 10/2010 |
| GB | 791463 | 3/1958 |

OTHER PUBLICATIONS

British Search Report dated Mar. 17, 2011 in British Patent Application No. GB1020418.8.

* cited by examiner

*Primary Examiner* — Andrew Nguyen
(74) *Attorney, Agent, or Firm* — Oliff PLC

(57) ABSTRACT

A fluid impingement arrangement comprising a supply manifold and at least one nozzle exit coupled to the supply manifold. The nozzle exit is arranged as a Coanda surface having a restriction and has at least one static pressure tapping that cross-connects two regions of the restriction to induce passive oscillation in a fluid jet passing through the nozzle exit.

17 Claims, 4 Drawing Sheets

FLUID IMPINGEMENT ARRANGEMENT

The present invention relates to a fluid impingement arrangement. It finds particular, but not exclusive, utility for fluid impingement applications in a gas turbine engine.

Fluid impingement is used in a variety of applications to transfer fluid from one location to another. In particular it is used to transfer cooling fluid onto a hot surface to effect cooling. In a gas turbine engine impingement cooling is used in a number of applications. For example, combustor wall cooling, rotor tip clearance control by cooling the surrounding casing, and cooling of specific components including electronics. Alternatively fluid impingement can be used to heat a cold surface, for example to effect anti-icing heating of a gas turbine engine nacelle.

A conventional fluid impingement arrangement comprises at least one aperture or jet nozzle coupled to a supply manifold. Fluid, such as air from the bypass duct for gas turbine engine applications, is supplied through the manifold and expelled through the aperture or jet nozzle as a coherent jet that propagates through the intervening space to a surface to be impingement cooled or heated. Typically the fluid supplied to the supply manifold is pressurised above the ambient pressure so that the jet is expelled with greater velocity and therefore travels further across the intervening space.

One disadvantage of this arrangement is that a large fluid flow is required to effect sufficient cooling, particularly of a large surface area. For a gas turbine engine application, this requires a large amount of working fluid to be extracted from the main flow path to be used for impingement cooling which has consequent detrimental effect on the specific fuel consumption and efficiency of the engine. In order to control the amount of cooling air flow in different operational modes of the engine to improve fuel consumption, valves and the like can be employed but these add weight, complexity and cost.

The present invention provides a fluid impingement arrangement that seeks to address the aforementioned problems.

Accordingly the present invention provides a fluid impingement arrangement comprising a supply manifold; at least one nozzle exit arranged as a Coanda surface having a restriction, the nozzle exit coupled to the supply manifold; and at least one static pressure tapping that cross-connects two regions of the at least one nozzle exit at the restriction to induce passive oscillation in a fluid jet passing through the nozzle exit. Advantageously, this enables a larger surface area to be impinged by the resulting oscillating fluid jet. It also means that no active control mechanisms are required thereby reducing complexity, weight and cost.

The at least one nozzle exit may comprise an elongate slot. The at least one tapping may cross-connect two regions on opposite sides of the slot. The at least one tapping may pass through the supply manifold or through the restriction. Thus the fluid impingement arrangement can be more compact when required.

The at least one nozzle exit may comprise an array of nozzle exits, adjacent nozzle exits having a common partition wall such that the array is elongate. The at least one nozzle exit may be arranged to induce oscillation in a direction perpendicular to the length of the array. Alternatively the at least one nozzle exit may be arranged to induce oscillation in a direction parallel to the length of the array. The at least one tapping may cross-connect the restriction of a first of the nozzle exits with the restriction of a second of the nozzle exits. Sequential tappings along the array of nozzle exits may cross-connect the restrictions of nozzle exits on alternate sides. The supply manifold may be partitioned to match the array of nozzle exits, or with different spacing.

The fluid impingement arrangement may further comprise an additional static pressure tapping configured to change the oscillating frequency of the fluid jet. Advantageously this enables a common design of fluid impingement arrangement which can be configured for a variety of applications. For example, the same design can be installed in a variety of locations in a gas turbine engine and configured separately for each location. The additional tapping may comprise a resonant chamber, which may have variable capacity.

The fluid impingement arrangement may further comprise a fluid source and a forcing mechanism to drive the oscillation of the fluid jet.

The at least one nozzle exit may comprise an array of discrete nozzles. Each discrete nozzle may have regular polygonal cross-section. The fluid impingement arrangement may further comprise a tapping across the restriction of each discrete nozzle.

The present invention also provides a case cooling arrangement, an anti-icing arrangement or a gas turbine engine comprising a fluid impingement arrangement as described. The present invention also provides a gas turbine engine comprising a case cooling arrangement or an anti-icing arrangement as described.

The present invention will be more fully described by way of example with reference to the accompanying drawings, in which.

Figure 1:
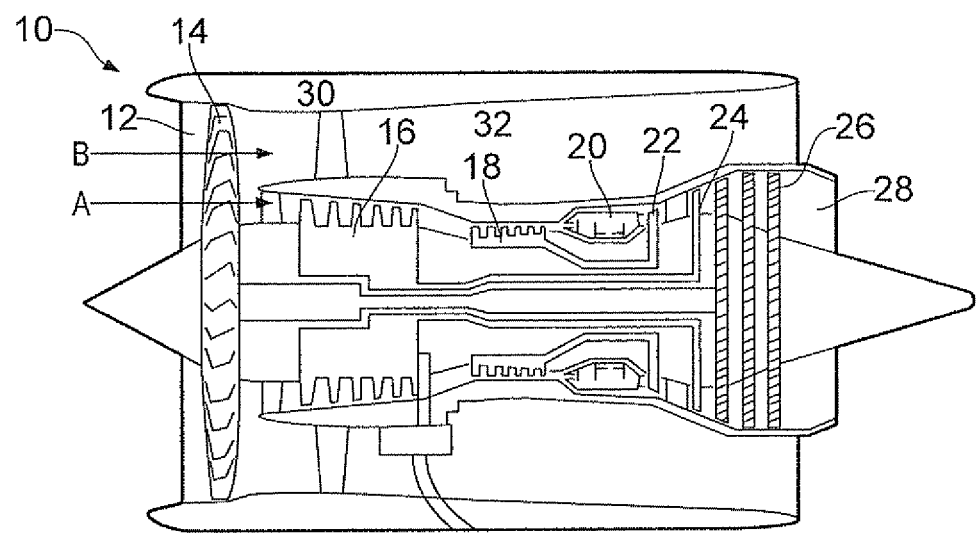
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
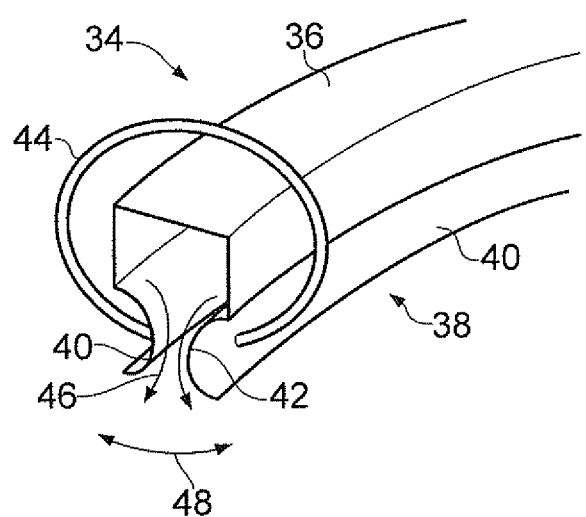
FIG. 2 is a partial schematic perspective view of an embodiment of a fluid impingement arrangement according to the present invention.

A first embodiment of the fluid impingement arrangement 34 according to present invention is shown in FIG. 2. The fluid impingement arrangement 34 is suitable for providing impingement cooling, for example of the casing of the combustor 20, tip clearance control of the turbines 22, 24, 26 or cooling of specific components within the gas turbine engine 10 including the electronics provided for control and/or monitoring of the engine 10. The fluid impingement arrangement 34 is also suitable for providing impingement heating, for example of the nacelle 30 at the air intake 12 to prevent or mitigate icing.

The fluid impingement arrangement 34 comprises a fluid supply manifold 36 that receives fluid from a source via suitable ducting (not shown). For example, for a gas turbine engine 10 cooling application the supply manifold 36 may receive cooling air from the bypass duct 32 or from the intermediate pressure compressor 16. The supply manifold 36 may be annular or otherwise elongate.

The fluid impingement arrangement 34 also comprises a nozzle exit 38 coupled to the supply manifold 36 and formed, in this first embodiment, from two sides 40. Each side 40 is shaped as a Coanda surface, meaning it is curved between its upper edge at the junction with the supply manifold 36 and its lower, distal edge. The sides 40 are curved so as to bulge towards each other such that a restriction 42 is formed where they are closest, intermediate the upper and lower edges. Preferably the sides 40 are symmetrical about a plane extending between them. The shape of each side 40 causes a fluid jet 46 passing through the nozzle exit 38 to adhere to one of the sides 40.

The fluid impingement arrangement 34 also comprises a static pressure tapping 44 that connects between two regions of the restriction 42. The two regions are on opposite sides 40 of the nozzle exit 38 and may be in the same or in different cross-sectional planes through the fluid impingement arrangement 34. The tapping 44 is a thin tube or pipe that extracts a small amount of flow from one side 40 of the nozzle exit 38 and delivers it to the other side 40. This has the effect of reducing the static pressure at the delivery side 40 and, due to a fluid jet 46 passing through the nozzle exit 38, increasing the pressure at the extraction side 40 thereby causing the fluid jet 46 to migrate to the lower pressure region. This in turn has the effect of reversing the pressure field in the tapping 44, thereby reversing the high and low pressure sides 40 and causing the fluid jet 46 to migrate to the new lower pressure region. Thus the fluid jet 46 is made to oscillate from side 40 to side 40 as illustrated by double-headed arrow 48.

Beneficially, this is a passive oscillation because no moving components are required to start or perpetuate the motion. Instead, the oscillation is started by the fluid jet 46 cohering to one of the sides 40, due to its flow rate and the dimensions and shape of the Coanda surface, and is perpetuated by the pressure reversals through the tapping 44. The oscillation has the effect that a large surface area is impinged by the fluid jet 46 ejected from the fluid impingement arrangement 34. Therefore, for a gas turbine engine cooling application, less cooling fluid is required and so the efficiency of the engine 10 is improved relative to prior cooling arrangements. An additional advantage lies in the reduced sensitivity of the fluid impingement arrangement 34 to the distance between the nozzle exit 38 and the surface to be impinged. This means that parts of the fluid impingement arrangement 34 may be manufactured with less accurate tolerances, which tends to reduce the unit price, although the Coanda surfaces must be accurately manufactured to ensure propagation of the fluid jet oscillations.

Preferably there is more than one static pressure tapping 44 provided at intervals along the elongate extent of the fluid impingement arrangement 34. The ends of each tapping 44 may be in the same cross-sectional plane or may be axially displaced to lie in different cross-sectional planes. A first end of one tapping 44 may be in the same cross-sectional plane as a second end of another tapping 44 so that the effect of a series of such tappings 44 is of a helical tube, interrupted each time it passes through the restriction 42.

A variation of this embodiment, not illustrated, routes the tapping 44 through the supply manifold 36 which is useful for applications where space around the fluid impingement arrangement 34 is limited. Alternatively the tapping 44 may be routed through the restriction 42 of the nozzle exit 38 but this is more likely to impact the effective operation of the fluid impingement arrangement 34.

Figure 3:
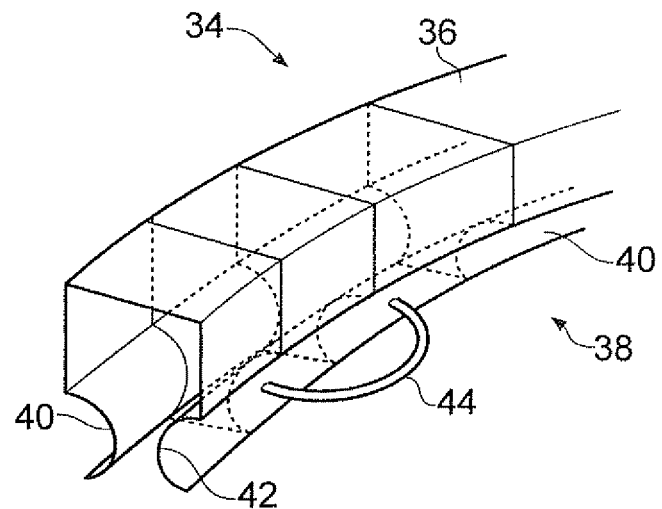
FIG. 3 is a partial schematic perspective view and FIG. 4 is a partial schematic top view of another embodiment of a fluid impingement arrangement according to the present invention.
Figure 4:
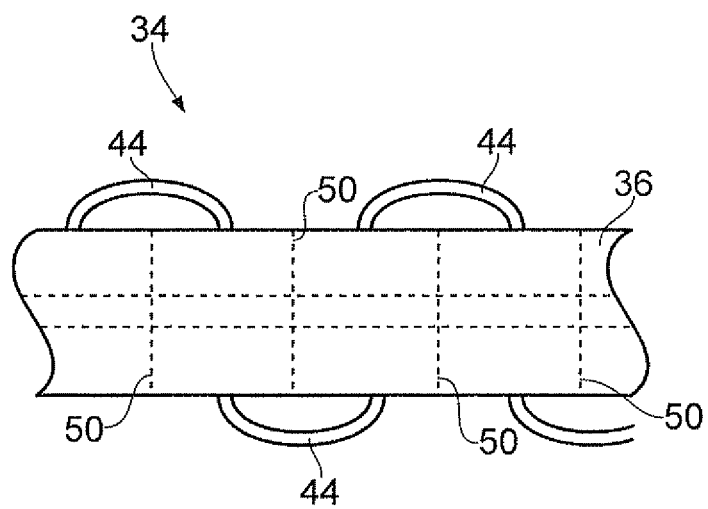

FIG. 3 and FIG. 4 illustrate a second embodiment of a fluid impingement arrangement 34 according to the present invention. The fluid impingement arrangement 34 is broadly similar to the first embodiment in FIG. 2 in that it includes an elongate fluid supply manifold 36 coupled to a nozzle exit 38 comprising two sides 40 forming a restriction 42. The sides 40 are each arranged as Coanda surfaces to which a fluid jet 46 can adhere.

The second embodiment differs from the first embodiment in that the fluid impingement arrangement 34 is partitioned longitudinally by a plurality of partition walls 50. Thus the fluid impingement arrangement 34 comprises an array of nozzle exits 38 and a corresponding array of supply manifolds 36, adjacent nozzle exits 38 and supply manifolds 38 being divided by a common partition wall 50. The partition walls 50 may be spaced at regular intervals or irregular intervals. In a preferred embodiment, the partition walls are equally spaced so that the supply manifolds 36 are substantially cubic but other spacing is also suitable for obtaining the benefits of the invention.

The second embodiment, as illustrated, comprises tappings 44 that cross-connect two regions of the restriction 42. Each tapping 44 is located on one side 40 and cross-connects the restriction 42 of two adjacent nozzle exits 38, rather than cross-connecting from one side 40 to the other. Sequential tappings 44 are arranged so that a first tapping 44 is on one side 40 of the fluid impingement arrangement 34 and the next tapping 44 is on the other side 40 of the fluid impingement arrangement 34. The restriction 42 of each nozzle exit 38 is coupled to two tappings 44, one that cross-connects to the adjacent nozzle exit 38 on a first side 40 and the other that cross-connects to the adjacent nozzle exit 38 in the other direction on the second side 40. This can be seen most clearly in FIG. 4.

The fluid impingement arrangement 34 according to the second embodiment of the present invention can be manufactured as a monolithic component or may be comprised of an array of partial components that are connected together. Either construction method, or any other suitable alternatives known to the skilled reader, will result in a cheaper and simpler fluid impingement arrangement 34 because the manufacturing tolerances need be less accurate than for prior art arrangements.

Figure 5:
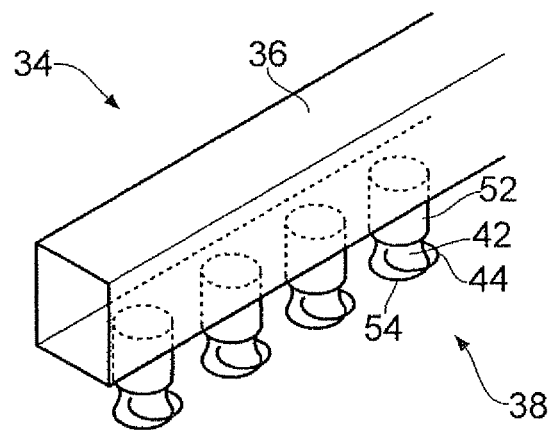
FIG. 5 is a partial schematic perspective view of another embodiment of a fluid impingement arrangement according to the present invention.

A third embodiment of the fluid impingement arrangement 34 according to the present invention is illustrated in FIG. 5. In this embodiment there is a common supply manifold 36 as in the first embodiment. The fluid impingement arrangement 34 comprises a longitudinal array of discrete nozzle exits 38. Each discrete nozzle exit 38 comprises a supply portion 52 that fluidly couples between the supply manifold 36 and a skirt portion 54 that forms a Coanda surface with a restriction 42 intermediate the supply portion 52 and the exit aperture. The discrete nozzle exits 38 may have regular polygonal cross-sections, preferably circular in cross-section. A tapping 44 is provided for each discrete nozzle exit 38 and cross-connects between two regions of the restriction 42, preferably opposite to each other to cause the maximum surface area to be impinged by a fluid jet 46 through each nozzle exit 38. For a circular cross-section nozzle exit 38, the ends of the tapping 44 are preferably located diametrically opposite to each other although other arrangements are possible.

Figure 6:
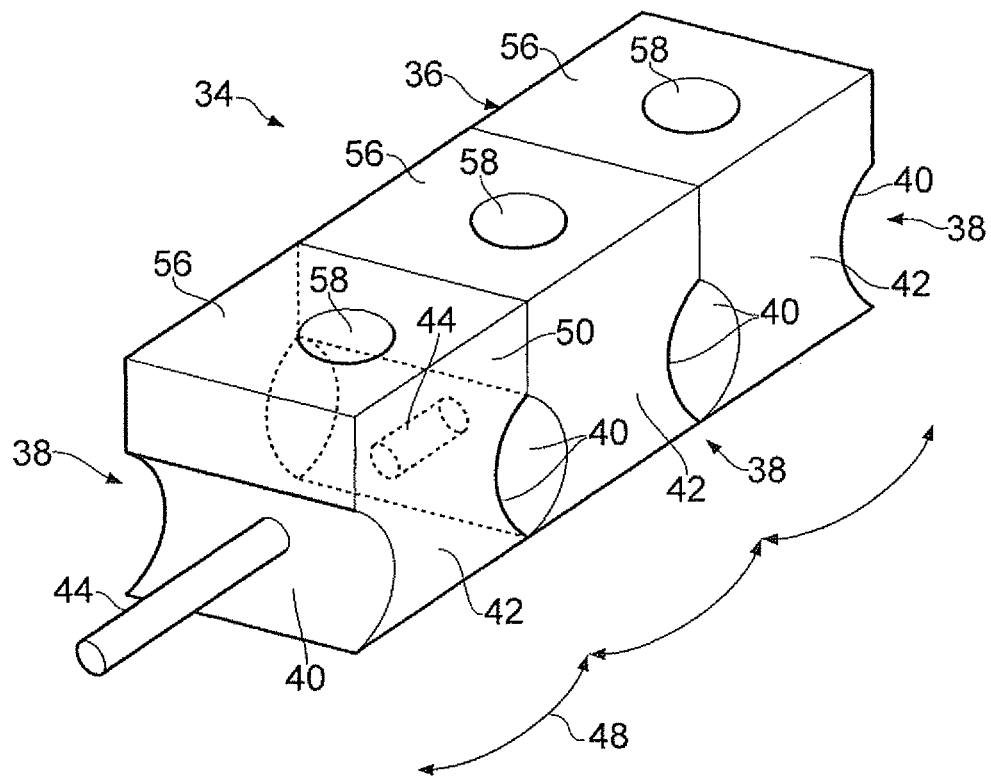
FIG. 6 is a schematic perspective view of another embodiment of a fluid impingement arrangement according to the present invention.

A fourth embodiment of the present invention is illustrated in FIG. 6. In this embodiment the fluid supply manifold 36 takes the form of a longitudinal array of discrete cells 56. Each cell has a nozzle exit 38 comprising two sides 40 that are opposed to one another and shaped as Coanda surfaces. The two sides 40 thus form a restriction 42 in the nozzle exit 38. Each cell 56 is provided with a supply aperture 58 through which fluid is supplied from a fluid source, such as a manifold. Adjacent cells 56 are contiguous over a portion of their adjacent sides 40 but the sides 40 are not permeable, forming a partition wall 50 in the fluid supply manifold 36. The cells 56 are aligned so that the fluid jets 46 oscillate parallel to the length of the array, as shown by arrows 48, instead of perpendicular thereto which is the effect of the previous embodiments. This may be particularly beneficial where the fluid impingement arrangement 34 is provided to impinge on an annular array as the direction of oscillation is aligned with the location of the components, for example where it is provided to cool an annular array of turbine blades or stators in a gas turbine engine 10. Additionally, for a rotor stage the oscillation is aligned with the direction of rotation of the rotor so that any circumferential location may receive more impingement cooling than is possible with other arrangements.

Static pressure tappings 44 are provided between the sides 40 of adjacent cells 56 to join the restrictions 42 of those adjacent cells 56. The fluid impingement arrangement 34 functions in a similar manner to previous embodiments, namely that the tapping 44 on one side 40 of a cell 56 extracts some fluid from the fluid jet 46 and delivers it to the side of the next cell 56. This raises the static pressure by the extraction end of the tapping 44 meanwhile it lowers the static pressure at the delivery end of the tapping 44 causing the fluid jet 46 in that cell 56 to migrate towards the lower pressure side 40. The movement of the fluid jets 46 causes the pressure at the other side 40 of each cell 56 to change and therefore reverses the direction of flow through the tappings 44. This in turn causes the fluid jets 46 to migrate to the new lower pressure side 40 which sets up the oscillation.

A variation of the fourth embodiment of the fluid impingement arrangement 34 of the present invention provides a tapping 44 that extends out from the last cell 56 in the array forming the fluid supply manifold 36. This tapping 44 is coupled to a source of fluid and a forcing mechanism such as a valve or pump. The oscillations of the fluid jets 46 can then be initiated and maintained by forcing fluid into the last cell 56 via the tapping 44. It will be understood by the skilled reader that any suitable forcing mechanism may be used but it will typically need to have a rapid response time. So for example a piezoelectric valve may be suitable.

Figure 7:
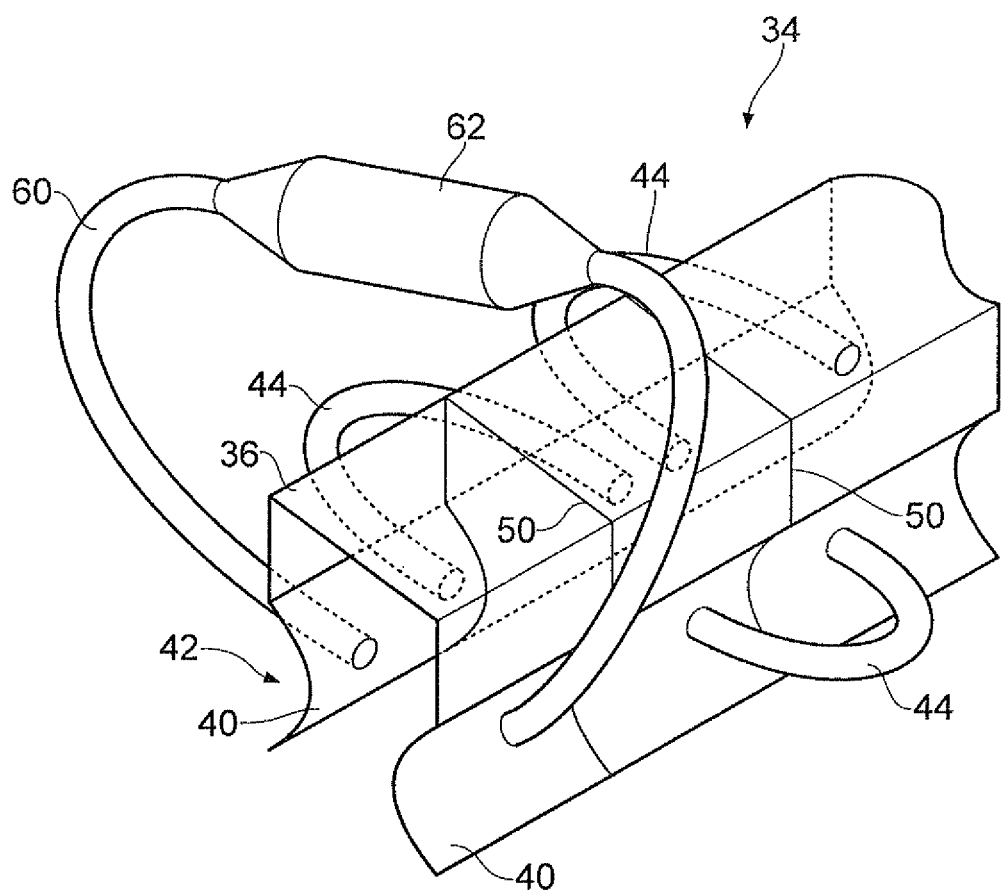
FIG. 7 is a schematic perspective view of another embodiment of a fluid impingement arrangement according to the present invention.

A fifth embodiment of the fluid impingement arrangement 34 of the present invention is shown in FIG. 7 and is substantially similar to the second embodiment shown in FIG. 3 and FIG. 4. In this embodiment an additional tapping 60 cross-connects the two sides 40 of the nozzle exit 38 at the height of the restriction 42. The ends of the additional tapping 60 are substantially axially aligned so that they are both within a space bounded by an adjacent pair of partition walls 50. The additional tapping 60 may be longer than the tappings 44 so that it changes the resonant frequency of the fluid impingement arrangement 34. Alternatively the additional tapping 44 may include a resonant chamber 62 to further alter the resonant frequency of the fluid impingement arrangement 34.

An application of the fluid impingement arrangement 34 according to the fifth embodiment may comprise a single additional tapping 44 or a plurality thereof. A large arrangement may benefit from comprising a plurality of shorter arrangements 34 that do not have fluid communication therebetween and with an additional tapping 60 provided for each shorter arrangement 34.

A combination of the fourth and fifth embodiments could result in an additional tapping 60, with or without a resonant chamber 62, being provided for each cell 56 so that the fluid jet 46 in adjacent cells 56 can oscillate at different frequencies. This enables the fluid impingement arrangement 34 to have portions tailored for specific behaviour. For example, it may be appropriate to have a lower frequency portion to impinge on electronics and a higher frequency portion to impinge on plain casing.

The resonant chamber 62 could comprise an extendable volume so that a range of frequencies can be provided. This offers a more controllable system but requires control and movement mechanisms which are more complicated than the passive systems.

Advantageously the present invention uses less air than previous impingement cooling arrangements but delivers improved cooling with a higher heat transfer coefficient. The improved engine efficiency manifests as a lower specific fuel consumption which reduces running costs. Improved cooling may also result in longer component life and reduced maintenance expenditure.

Although three main embodiments of the fluid impingement arrangement 34 of the present invention have been illustrated and described it will be apparent to the skilled reader that variations, adaptations and modifications are possible within the scope of the claimed invention. For example, the supply manifold 36 may be continuous whilst the nozzle exit 38 is an array separated by partition walls 50.

Any of the described embodiments and variations may be used for a variety of fluid impingement applications. In a gas turbine engine 10 the fluid impingement arrangement 34 according to the present invention may be a case cooling arrangement, a rotor tip clearance arrangement, an anti-icing heating arrangement or used for targeted cooling or heating of particular components having a surface area that can be heated or cooled by a traversing flow.

The fluid impingement arrangement 34 of the present invention also finds utility in other industries. For example, it can be used to cool electronic components including microelectronics wherever they occur. The fluid impingement arrangement 34 is also applicable to food processing, for cooking or cooling food, and in air conditioning systems. It may also be used for paint drying and other tasks in the automotive industry.

The invention claimed is:

1. A gas turbine engine comprising:
   a fluid impingement arrangement including:
   a supply manifold;
   at least one nozzle exit arranged as a Coanda surface having a restriction, the at least one nozzle exit being coupled to the supply manifold, wherein the Coanda surface includes a curved surface from upstream of the restriction to a downstream end of the nozzle exit, and wherein the at least one nozzle exit impinges fluid on a wall of the gas turbine engine; and
   at least one static pressure tapping that directly cross-connects two regions of the at least one nozzle exit at the restriction such that passive oscillation is induced in a fluid jet passing through the nozzle exit.

2. The gas turbine engine of claim 1, wherein the at least one nozzle exit includes an elongate slot.

3. The gas turbine engine of claim 2, wherein the at least one tapping cross-connects two regions on opposite sides of the slot.

4. The gas turbine engine of claim 2, wherein the at least one tapping passes through the supply manifold or restriction.

5. The gas turbine engine of claim 1, wherein the at least one nozzle exit includes (i) an array of nozzle exits, and (ii) at least one common partition wall disposed between adjacent nozzle exits such that the array is elongate.

6. The gas turbine engine of claim 5, wherein the at least one nozzle exit is arranged to induce oscillation in a direction perpendicular to the length of the array.

7. The gas turbine engine of claim 5, wherein the at least one tapping cross-connects the restriction of a first of the nozzle exits with the restriction of a second of the nozzle exits.

8. The gas turbine engine of claim 5, wherein the at least one nozzle exit is arranged to induce oscillation in a direction parallel to the length of the array.

9. The gas turbine engine of claim 7, wherein sequential tappings along the array of nozzle exits cross-connect the restrictions of nozzle exits on alternate sides.

10. The gas turbine engine of claim 5, wherein the supply manifold is partitioned.

11. The gas turbine engine of claim 1, wherein the fluid impingement arrangement further includes an additional static pressure tapping configured to change an oscillating frequency of the fluid jet.

12. The gas turbine engine of claim 11, wherein the additional tapping includes a resonant chamber having fixed or variable capacity.

13. The gas turbine engine of claim 11, wherein the fluid impingement arrangement further includes a fluid source and a forcing mechanism configured to drive the oscillation of the fluid jet.

14. The gas turbine engine of claim 1, wherein the at least one nozzle exit includes an array of discrete nozzles.

15. The gas turbine engine of claim 14, wherein the fluid impingement arrangement further includes a tapping across the restriction of each discrete nozzle.

16. The gas turbine engine of claim 1, further comprising a case cooling arrangement including the fluid impingement arrangement.

17. The gas turbine engine of claim 1, further comprising an anti-icing arrangement including the fluid impingement arrangement.

* * * * *